United States Patent Office 2,981,980
Patented May 2, 1961

2,981,980

PRODUCTION OF LIGHT POLARIZING ELEMENTS

Alfred Winsor Brown, Woonsocket, R.I., and Robert E. Evans, Newark, Ohio, assignors to Owens-Corning Fiberglas Corporation, a corporation of Delaware No Drawing. Filed Dec. 13, 1956, Ser. No. 627,980

8 Claims. (Cl. 18—55)

This application is a continuation-in-part of Serial No. 596,397, filed July 9, 1956.

This invention relates to the production of polarizing elements, and, more particularly, to the production of material which is polarizing by virtue of the incorporation therein of glass in the form of flakes or flakelets.

Various naturally occurring and synthesized materials are polarizing, or orienting, to light waves. A wave of ordinary or unpolarized light is considered as involving vibrations in random directions lying in a plane perpendicular to the direction of propagation of the wave. Polarized light may be considered as a fraction of ordinary light, being the part of the normal vibration which lies, also, in a plane through the axis of the wave. It has been demonstrated that polarized light, when produced by filtering the random vibrations which do not lie in the second identified plane, can constitute not more than 50 percent of the wave energy of the original or unpolarized light.

The large scale production of polarizing elements was first made possible by the discovery that minute crystals of a polarizing material can be incorporated in a plastic sheet material, suitably oriented, and then formed into polarizers of desired shapes.

A more recent development (see U.S. Patent 2,402,176 and Science Illustrated, volume 4, No. 6, June 1949, pages 24–27) is based upon the discovery that polarizing elements can be produced from a multiplicity of layers of very thin plastic material suitably adhered into the polarizing element. This recent development provides, from many standpoints, a substantial improvement in the production of polarizing elements. There are, however, difficulties from the processing standpoint as will be immediately apparent from a consideration of the requirements such material must meet. For example, the individual sheets of a plastic material must have a maximum thickness of about 0.004", preferably a thickness of 0.0015" or less, and from 15 to 30 such sheets must be formed into the polarizing element. The sheets must be separated from one another by a distance greater than the wave length of the light to be polarized, but not more than about 0.010", and a substance (usually air) having a refractive index differing from that of the sheets by at least 0.2 must be disposed between adjacent sheets. The necessary spacing can be achieved by means of spot adhesive or of suitable spacing means at the edges holding the entire assembly in transverse tension, air or gas being included and sealed between the adjacent sheets.

Methods for producing glass in the form of flakelets are known, and such material, refractive index 1.55, is presently available in substantial quantities. The production of papers therefrom has been suggested, but the product "possessed no tear strength" (see "Properties of Paper Made From Glass Flakes," Callinan and Lucas, Report of N.R.L. Progress, May 1955). Impregnation of the paper with various binders was suggested to provide a tear strength that would make feasible the use of the product in contemplated applications.

It has been found that a polarizing element somewhat similar to that disclosed in U.S. Patent 2,402,176 can be produced by dusting glass flakelets onto a transparent plastic sheet. Either a transparent or a translucent (light-diffusing) sheet can also be placed above the flakelets. If desired, the edges of the two sheets could be sealed together with any suitable adhesive in order to form a unitary sandwich structure which would constitute a usable polarizing element. As has been stated above, the glass flakelets have an index of refraction of about 1.55. Air, which separates the flakelets in the structure described, has a refractive index of 1.00. As a consequence, such structure comprises a mass of glass flakes supported in spaced arrangement in the mass, and a substance (air) having a refractive index differing from that of the glass by at least 0.2 disposed between adjacent flakelets. It is believed that a similar polarizing element could be produced by positioning a sheet of paper made from glass flakelets on a transparent sheet in a like manner. Such polarizing elements, while not specifically disclosed in the prior art, are difficult to produce. Neither a prior art paper produced from glass flakelets and impregnated with a binder nor a sheet of transparent material reinforced with glass flakelets constitutes a polarizing element because the requisite difference in refractive index between glass and binder does not exist.

The present invention is based upon the discovery of light polarizing elements which can be produced with facility from thin plates or flakelets of glass. The glass flakelets are bound in place in the polarizing elements by a suitable binder.

An object of the invention is to provide an improved method for making light polarizing elements.

Other objects and advantages will be apparent from the description which follows, which is intended only to illustrate and disclose, but in no way to limit, the invention.

A new light polarizing element is provided according to the invention. Such polarizing element comprises a mass of glass flakelets supported in spaced arrangement in the mass by a suitable binder, and a substance having a refractive index differing from that of the glass by at least 0.2 disposed between adjacent flakelets.

As will subsequently be discussed in more detail, the substance having a refractive index differing from that of the glass by at least 0.2, which substance is disposed between adjacent flakelets, can be air or other gas, can be a coating applied to the glass flakelets, or can be a portion of the binder material itself.

The binder can be any suitable organic or inorganic, natural or synthetic adhesive composition. It is preferred that the binder be at least virtually transparent in order to avoid absorption, by the polarizing element, of any appreciable portion of transmitted light. Polyvinyl acetate, polyvinyl pyrrolidone, polyvinyl methyl methacrylate, methyl methacrylate and other acrylic binders, polystyrene, and various polyesters can be mentioned as specific suitable organic binders that are at least virtually transparent. Silicic acid, magnesium silicate, and silicates of other metals forming oxides, hydroxides and carbonates having a pH not greater than 10.5 can be mentioned as specific inorganic binders. Neither the strength characteristics, within the limits, nor the chemical identity of the binder employed in a polarizing element according to the invention is of particular importance. The sole function of the binder is to support the flakes or platelets of glass relative to one another. If greater strength than is provided by the binder is required, the polarizing element can be positioned on a supporting sheet, for example, of glass or of a transparent or translucent sheet material, or between two such sheets. Such sheet or sheets can provide the required strength, while the element according to the invention is polarizing to light transmitted therethrough. If desired, at least one such sheet can be diffusing to light.

One method for producing a light polarizing element according to the invention comprises forming a uniform suspension of a limited amount of a suitable binder, a solvent or dispersing agent therefor, and glass flakes or platelets, for example, in a paper beater, casting the resulting suspension on a suitable foraminous base, for example, a screen, allowing excess binder and solvent or dispersing medium to drain through the foraminous support, and hardening the binder. Only a limited amount of the binder should be employed to produce a polarizing element according to this method when presently available glass flakelets are employed. As has been indicated above, such flakelets have a refractive index of about 1.55, which is substantially identical with the refractive indices of most binders. Therefore, if a large amount of the binder is employed, so that the space between adjacent flakelets is completely filled with binder, the resulting paper has a substantially constant refractive index throughout its thickness, and does not act as a polarizing element.

In a specific instance, a polarizing element has been produced in the manner described in the preceding paragraph, using water as a dispersing medium from glass flakelets and three percent of polyvinyl acetate as a binder, based upon the total weight of glass and binder. In general, from about 1 percent to about 5 percent of a binder, based upon the total weight of glass and binder, can be employed to produce such a polarizing element. In view of the foregoing discussion, it will be appreciated that the ability of such papers to polarize light is attributable to the presence of a gas, usually air, between adjacent flakelets, or between flakelets and binder. The refractive index of the gas is about 1.00, and that of the binder and glass about 1.55. Using such glass flakelets, the production of a paper with more than about 5 percent of a binder, based on the weight of binder and glass, results in a paper having relatively few gas-filled voids, and, as a consequence, relatively few discontinuities in refractive index. Such a paper is comparatively ineffective as a polarizing element, and is completely non-polarizing if all such gas-filled voids are eliminated. A polarizing element which has been produced using less than about 1 percent of a binder, on the indicated basis, is comparatively unsatisfactory because of its relative weakness.

When it is desired to produce a polarizing element according to the invention in the form of a paper, and using more than about 5 percent, on the indicated basis, of a binder, an addditional step, beyond those discussed above, is required. For example, a coating of high refractive index can be applied to the glass flakelets; a controlled amount of air or other gas can be incorporated into the slurry; a vaporizable material such as a volatile solvent can be incorporated into the slurry and volatilized after formation of the paper to force a separation between the binder and the flakes; or the binder can be treated to effect gassing of a portion thereof in order to force a separation between the binder and the flakes. A polarizing element according to the invention can also be produced, for example, in the form of a paper, from glass flakelets having a refractive index differing from that of the binder by at least 0.2, preferably by at least 0.5.

In general, when glass flakelets produced from a glass having a refractive index differing from that of the binder are employed to produce a polarizing element, is is preferred that the refractive index of the glass be higher than that of the binder. In such instance, a light wave passing through the polarizing element is subjected to the requisite change in refractive index in passing from glass to binder or air, in passing from binder to glass or air, and in passing from air to binder or glass. A polarizing element produced from glass having a high refractive index, for example, approximately 2, need not contain pockets of air or other gas, as the binder itself can constitute a substance disposed between adjacent flakelets, and having the requisite different refractive index; the same is true of polarizing elements produced from flakelets coated with a material of high refractive index.

A coating of high refractive index can be applied to glass flakelets in any of several ways. For example, titania, zirconia, or like materials, can be deposited on the glass surface, as in a drum tumbling device containing glass flakes and such a material. The surfaces of the glass flakes can also be treated with titanium tetrachloride, and then with ammonium hydroxide, and pyrolized, for example, at about 600° F. $TiO_2$ is formed on the glass surfaces as a result of such treatments. The glass surfaces can also be heated and exposed to a gaseous atmosphere of tetraisopropyl titanate, or tetraisopropyl titanate can be dissolved in a suitable solvent, applied to the glass surfaces, and a titanium silicate coating formed by heating.

One method for producing glass flakelets involves flowing a stream of molten glass through an annular orifice in the form of a tube, gripping and advancing the tube with attenuating rolls disposed below the orifice, and introducing air or other gas into the interior of the tube under slight pressure to prevent collapse of the walls thereof, or to cause slight expansion thereof. A coating of high refractive index can be applied to the interior of the tube by using isopropyl titanate as the gas which prevents collapse of the walls of the tube in such process. The coating would then be only on the inner surfaces of the tube, and on only one side of the glass flakelets formed by cracking of the tube. However, if desired, the tube could also be suitably enclosed and an atmosphere of tetraisopropyl titanate maintained on the exterior thereof. Glass flakelets formed by cracking such a tube would then have the coating on both surfaces thereof.

It will be appreciated from the foregoing discussion that, in many instances, a layer of air or other gas, disposed between at least one side of a flake and a binder suporting that flake relative to the remainder of the element, is advantageous in polarizing elements according to the invention. The provision of such a layer of air or other gas can be facilitated by employing glass flakelets that are not planar, but have a certain curvature. Glass flakelets having a curvature can be produced in generally the manner described above by eliminating the pressure of air or other gas inside the tube so that the walls thereof are collapsed by the pull of the attenuating rolls.

Two part flakes, hereinafter for convenience referred to as "double glass flakelets" can also be produced as described in U.S. Patent 2,457,785. Such flakes result from collapse of the glass tube between attenuating rolls, and cracking of the resulting film. The double glass flaklets are composed of two bodily separate flakelets which are loosely held together, probably by Van de Waal's forces.

It will be appreciated that the thickness of the glass flakelets can be a significant factor in determining the characteristics of polarizing elements according to the invention. Satisfactory results have been achieved using commercially available flakelets having an average thickness of about 0.0002 to 0.0003 inch, and probably varying several fold from such average. The average thickness of such flakelets can be increased or decreased, however, by decreasing or increasing the rate at which the attenuating rolls discussed above are driven. The thickness of the flakes or platelets of glass can, therefore, be varied within substantial limits either above or below the presently commercially available 0.0002 to 0.0003 inch thickness.

It has been found that air clings to the surfaces of glass flakes or platelets to an extent such that, if the flakelets are merely mixed with a suitable binder and the binder cured, air bubbles will cause the resulting cured mass to be opaque, or, at best, only translucent, even though both the binder and the glass are transparent. Various techniques have been tried to eliminate such air from binder-glass flakelet mixtures, prior to curing of the binder, because the entrapped air interferes with reinforcement of the binder by the flakes, as well as with light transmission. For example, glass flakelets have been mixed with monomeric styrene, in the absence of any polymerization catalyst for the styrene, and subjected to heat under vacuum in order to eliminate the entrapped air.

A somewhat similar, but modified, technique can also be employed in producing a polarizing element according to the invention. Such heating under vacuum can be carried only to a stage sufficient to eliminate a portion of the entrapped air, or substantially all the entrapped air can be eliminated, and then a controlled amount of air reintroduced into the mass. Because of the affinity of the glass flakes for air, the latter tends to collect preferentially at the interfaces between the flakes and the monomer. The resulting material can then be blended with a suitable binder which is compatible with the styrene or other monomer, and the resulting mixture cured, for example, in the form of sheets or any other desired form. The amount of entrapped air or other gas can be controlled so that a polarizing element according to the invention is produced directly by such cure. It will be appreciated that such polarizing element is not a paper, as was the case with elements previously discussed, but might rather be likened to a hardened sheet material reinforced with glass flakelets, but, in addition, having polarizing characteristics by virtue of the presence of the entrapped air, and its location at the interfaces between glass and binder.

A polarizing element in the form of a hardened sheet material reinforced with glass flakelets can also be produced by any of several other methods. For example, glass flakes can be mixed with a suitable binder resin, placed under vacuum to remove entrapped air, and the mixture placed between heated platens to form a cured sheet of desired form. The cured sheet can then be converted into a polarizing element by causing a disturbance at the interface between the glass and the binder. Such a disturbance can be caused by subjecting the sheet to mechanical shock, to high frequency electrical waves, or to thermal shock. In addition, such elements can be produced by curing the sheet at a temperature above the maximum curing temperature for the binder to cause rapid curing or overcuring thereof, and resulting disturbance at the interfaces. At least a part and preferably only a part of the flakes, before mixture with the binder, can also be treated with a material which provides a nonadhesive surface, for example, a silicone or an organic wax. Curing a sheet containing such flakelets produces a structure which is polarizing because of interfacial disturbances caused by lack of adhesion between the binder and the coating. Also, at least a part of the flake can be moistened, mixed with a binder, the mixture formed into the desired shape, and cured in a dielectric oven so that the moisture is vaporized, causing the desired disturbance at the interface between flake and binder. Moistening of the flake can be accomplished by use of liquid water, or in a high humidity atmosphere. Any suitable solvent can be used instead of water to moisten the flakes, or can be mixed with the binder in order to produce a similar gassing effect and resulting disturbance during curing. A gassing agent, such as monomeric styrene, an acrylic resin, or the like, can also be mixed with a suitable binder. Flakes can then be mixed with the binder composition, formed, and cured. The presence of the gassing agent also causes bubbling during curing, and disturbance at the binder-flake interface.

As a specific example, a polarizing element according to the invention can be produced from 100 parts of a polyester resin commercially available under the trade designation "P431," 10 parts of monomeric styrene, 1 part of benzoyl peroxide, and 50 parts of flake glass. The various ingredients are mixed until the flakes are wet by the resin; the mixture is then subjected to vacuum to remove most of the entrapped air, either during mixing or subsequent thereto; and sheets or other shapes are then formed by curing the mixture at about 200° F. between heated platens. The platens may be of such configuration to produce a flat sheet, a corrugated sheet, or any other desired shape. A flake glass paper of the type previously described can, if desired, be attached to the surface of the cured sheet, or positioned between the heated platen and the curing resin so that it will be adhered to the final cured sheet. The described composition of binder, styrene, benzoyl peroxide, and flake glass can also be extruded in any desired shape, for example, as rods, tubes, sheets or other, and subsequently cured. The resulting cured product can then be converted to a polarizing element by means of mechanical or thermal shock, or by means of high frequency electrical waves.

By adding one additional step to the procedure described in the preceding paragraph, a polarizing element according to the invention can be produced during cure of the binder. For example, about half of the glass flakes, before mixture with the polyester resin, styrene, and benzoyl peroxide, can be sprayed with the hydrolysis products of a mixture of phenyltrichlorosilane, diphenyldichlorosilane, and methyltrichlorosilane, or can be sprayed with an acetone solution of a hydrocarbon or other wax, and then mixed with the resin, styrene, and peroxide. The silicone or wax coating on the glass prevents adherence between the resin and the glass, with the result that the article, when cured, has sufficient interfacial disturbance between resin and glass that it is a polarizing element. In addition, the uncoated flakes provide reinforcement, and strengthen the article.

An improved method of forming a polarizing element involves the utilization of multiple heating steps to cure the binder and at the same time to disrupt the interfaces between the flakes and the binder. The initial heating of the resin and the flake mix at least partially cures or sets the resin and the subsequent heating step or steps disturb the resin to glass interfaces to provide polarization. This double heating may be used alone or in conjunction with the above use of hydrolyzed phenyltrichlorosilane or the like.

A polarizing element according to the invention has also been produced from a mixture of one part of a coupling agent commercially available under the designation "BJO," 80 parts of double glass flakes and 20 parts of a polyester resin commercially available under the trade designation "Vibrin 117." The mixture was cured, in the form of a sheet, under pressure in a suitable mold, for ten minutes at 150° F. and then for twenty minutes at 300° F. The resulting sheet was found to be polarizing. It will be noted that a high temperature cure was employed, as well as double glass flakelets. It is believed that both of these factors contributed to polarization, the former for reasons previously discussed. The double flakes are separated from one another at least at some points, by a thin film of air, so the necessary refractive index difference can be achieved therefrom. Another example of a polarizing element according to the invention is produced by curing in the described manner a mixture wherein single flakes are substituted for the double glass flakes.

The following compositions were mixed to form a polarizing panel:

*Example 1*

| | Parts by weight |
|---|---|
| Methyl methacrylate monomer | 70 |
| Polyester (P-433, Rohm & Haas) | 70 |
| Benzoyl peroxide catalyst | 2.8 |
| Untreated, single platelets of glass | 70 |

Example 2

| | |
|---|---|
| Styrene monomer | 70 |
| Polyester (P-433, Rohm & Haas) | 70 |
| Benzoyl peroxide catalyst | 2.8 |
| Untreated, single platelets of glass | 70 |

Both of the two above formulations were thoroughly mixed in a Hobart, high-speed mixer wherein the flakes were substantially broken with the result that a final flake or platelet size ranging from 1/6" to 1/8" appears to be produced. The platelet size should be from about 30 to about 60 mesh when producing either reinforced sheet or polarizing panels. Larger flakes make it difficult to obtain a uniform dispersion of flake and binder and smaller flakes unnecessarily increase the chance of un-oriented flakes which do not contribute to polarizing and do not contribute the desired reinforcement. After thorough mixing of the ingredients, the composition was subjected to a vacuum (minus 30" of mercury) for five minutes to remove entrapped air. The resulting de-aerated composition was then formed into sheets by placing the composition between sheets of cellophane and spreading the composition between these cellophane sheets with a roller to form a sheet about .06" thick. An appropriate jig was used to provide the proper sheet thickness. Overfeeding of properly spaced rolls may also be used to advance a sheet of the proper thickness therebetween. The resulting sheets were heated in an oven at about 250° F. to cure the resin.

Another method of forming a sheet comprises introducing the composition between the platens of a press. A total pressure of 1000 pounds which amounted to 10 pounds per square inch on the 100 square inch sheet was applied. The platens were heated with 10 pound per square inch steam (approximately 240° F.) to cure the composition of Example 2. A molding time of 5 minutes was used at about 212° F. to cure the composition of Example 1. The sheets so formed and cured had some sparkle but were relatively clear and transparent.

Subsequent heat treatments are used to make the above sheets polarizing. The subsequent heat treatments are carried out at about 275° F. in the case of the styrene monomer and at about 250° F. in the case of the acrylic composition. Much higher temperatures can be used, if desired. Temperatures up to 340° F. or more may be used. The time at which the cured sheets are exposed to further heat varies inversely with the temperature used. Polarizing panels have been formed using heating times of up to about 5 minutes or more.

The polarizing effect may be produced due to the vaporization of the styrene or acrylic monomer which forms transition layers or pockets between the flake and resin. These transition layers have a low refractive index which provides the necessary difference in index of refraction as compared to the glass so that polarization results. In addition to the formation of transition layers, it is believed that the differential expansion between the resin and the flake which takes place in the subsequent heating steps may cause physical separation of the flake from the resin during heating. The resin expansion is about 50 times as great as the glass expansion so that the heating tends to cause the resin to expand away from the glass. During cooling the resin tends to contract much faster than the glass with which it is associated and, therefore, separation again will be achieved.

It has been observed that a sheet which is heated to higher and higher temperatures will have greater and greater changes in appearance. An added sparkle is achieved in the panel which might be described as a silvery appearance. The panel no longer remains clear and transparent but becomes more milky or pearlaceous. If desirable, rapid cooling is used to increase the pearlaceous effect. The above phenomena may be provided by a combination of the vaporization of the monomer and the differential expansivities of the materials, cured resin and glass.

It has been found that sheets having the silvery appearance are polarizing. Postheating can be used to make panels polarizing or the polarizing effect can be increased by postheating. Multiple postheating steps may be used, if it is desired.

The postheating temperature depends upon the particular resin or resins being used and upon the monomer included in the previous cure cycle. Generally shorter postheating periods may be used if the original cure temperatures are high. If low original cure temperatures are used, the postheating temperatures should be increased to achieve the desired effect. If low cure temperatures are used, then the postheating must be carried out for long periods in order to get the polarizing effect. Long postheating is sometimes undesirable since the resin may tend to discolor from the application of the heat. When using polyester resins, the desired curing conditions generally vary from 10 to 50 pounds of steam (line gauge pressure) which provides temperatures of from about 240° F. to 298° F. With such cure temperatures the postheating temperatures will vary from about 250° F. to 400° F. in an air oven. If desirable, the flake and resin panels may be postheated between metal sheets or the like in order to conduct and transmit the heat of the oven to the panel more effectively and to provide the desired surface configuration.

Example 3

125 parts of polyester resin (P-433)
70 parts of double thickness flake
14 parts of styrene monomer
1.4 parts of catalyst (BPO)

This mix was rolled out into a sheet between two sheets of cellophane and then molded using 10 pounds of steam for about 15 minutes. A flat panel was molded with the distribution of the flake within the resin being good. The panel was then afterheated at about 390° F. for 5 minutes to cause the sheet to be polarizing. As the panel was removed from the postheating oven, it was quenched with water and then cooled between sheet metal plates to maintain the panel in a perfectly flat condition.

Polyester resin with flakes or platelets of glass may be cured at temperatures of about 300° F. and then postheated at from 300° F. to about 400° F. and cooled in air or water to enhance the polarizing properties of the panels. If desirable, one or both surfaces of the panels may be embossed to provide a random appearance. Some of the flakes will be tilted to provide further polarization of light hitting at an angle normal to the surface of the panel. In addition, the textured surface improves the appearance and acts as a diffusing surface for the light passing through the panel. Various surfaces including pebble-grained and deep, random embossing may be used. It is generally desirable to have the top surface of the panel smooth for ease of cleaning. A pebble-grain surface upsets the linear or planar relationship of flakes and also provides polarization at 90° where normally no polarization would be present. The pebble-grain surface provides a uniform appearance and minimizes non-uniformity of internal flake distribution.

A specific example of a binder composition which includes a gassing agent is produced by mixing 100 parts of the polyester resin, 35 parts of monomeric styrene, and 3 parts of benzoyl peroxide. A polarizing element according to the invention can be produced directly from this composition merely by mixing glass flakes therewith, subjecting the resulting mixture to vacuum to remove entrapped air, and then curing an element in the desired shape. The excess monomeric styrene acts as a gassing agent during cure, and causes the desired interfacial disturbance. The presence of a catalyst enhances the disturbance at the interfaces. The gassing effect can also be increased by curing at a relatively high temperature, e.g., about 250° F. and then postheating to enhance the polarization still further.

It has been found with the work using polyester resins that at least a minimum cure must be given to provide sufficient hardness in the resin before the postheating treatment so that an interfacial disturbance can be created by the heating and cooling. The postheating step makes the polyester resin soft again and, if desired, the molding or the embossing may take place during this postheating step. It is believed desirable to destroy from ½ to ⅔ of the total interfacial area. At least ⅓ of the surface should remain to provide the requisite strength in the reinforced resin product. It is generally desirable to have some structural strength remaining.

It will be appreciated that the techniques of using a binder composition containing a gassing agent, or a solvent, can be employed in the production of polarizing elements in the form of glass flake papers.

Although a description of thermosetting resins has been used in the examples, thermoplastic resins may be used also in producing polarizing members. Resins such as the acrylic resins, styrene, methyl styrene, methyl methacrylate, methyl ethacrylate, ethyl methacrylate, ethyl ethacrylate, and others may be used in a similar manner as described for the thermosetting resins of the examples.

Polarizing elements can advantageously be used as window panes, headlight lenses, light bulbs, Venetian blind slats, light fixtures, in industrial glazing, as street lighting diffusers, lamp shades, inserts for glass block, or as coatings on the inside or outside of light bulbs. Particularly in the case of flash bulbs which are to be used in colored photography, polarizing coatings are advantageous because color definitions and film efficiency are improved by polarizing light. A particularly advantageous way for producing a light bulb, either a flash bulb or one used for ordinary lighting purposes, is by forming a slurry of a binder and flake glass, and including a gassing agent, such as a solvent, an excess of styrene, an acrylic resin, or the like, and applying this slurry to at least one surface of the bulb, either interior or exterior. The slurry can be applied by brushing, flowing, spraying, dipping or the like, and then can be hardened by heating. During hardening of the coating, the interfaces between binder and glass are disturbed by the presence of the gassing agent, with the result that the bulb is polarizing.

The paper-making procedures described above have also been employed to produce papers 0.012 inch thick and 0.006 inch thick from a mixture of 50 parts of glass flakelets and 50 parts of bleached kraft, and to produce papers 0.015 inch thick and 0.005 inch thick from a mixture of 75 parts of flake glass and 25 parts of bleached kraft. The papers have increased dielectric strengths and reduced moisture vapor transmissions by virtue of the inclusion therein of glass flakelets. Thin laminates produced therefrom, using polyester, epoxy, or low-loss phenolic binders have good tensile impact and flexural strengths, low moisture absorption and transmission, and good surface hardness and flame and abrasion resistance. The papers or laminates produced therefrom are promising as surfacing sheets, e.g., exterior, electrical laminates, road sign laminates, pipe materials, and in various decorative applications.

The terms "percent" and "parts" as hereinbefore used, and as used in the appended claims refer to percent and parts by weight, unless otherwise indicated.

It will be apparent that various changes and modifications can be made from the specific details discussed above without departing from the spirit of the attached claims.

We claim:

1. A method for producing a light polarizing element which comprises mixing glass flakelets with a resinous material hardenable to a transparent mass, hardening the resinous material, and subjecting the resulting mass to a thermal shock to cause a disruption of glass-resin interfaces.

2. Method of producing a resin and glass element comprising mixing platelets of glass with a resinous material hardenable to a transparent mass, hardening the resinous material, and postheating at least one component of the element to cause an interfacial disruption between platelets and said resin.

3. Method of producing a light polarizing sheet comprising intimately mixing a polyester resin with platelets of glass to wet completely the glass surfaces, forming a sheet of the mixture of resin and glass and heating to harden the resin, and after the resin is hardened reheating the sheet to from about 250° F. to 350° F. to disrupt glass-resin interfaces and form a gas pocket between the glass and resin having an index of refraction different from that of said platelets of glass.

4. Method of producing a light polarizing element comprising wetting the surfaces of flakes of glass with a resin, forming a sheet of the wet flakes of glass, hardening the resin to form an integral mass of flakes of glass and resin, and heating and subsequently cooling the composite to disrupt the resin and glass interfaces.

5. A method for producing a light polarizing element which comprises mixing about 70 parts by weight of glass flake with a binder composition which consists essentially of 70 parts by weight of a polyester resin curable by addition polymerization to a hard, light transmitting mass, 70 parts by weight of styrene monomer and about 2.8 parts by weight of benzoyl peroxide catalyst, forming the resulting mixture into a desired shape, applying heat and pressure to the resulting shape to convert the polyester to a hardened condition, and postheating the resultant product to a temperature of about 250° F. to 400° F. to disrupt the resin and flake interfaces to provide a polarizing effect.

6. A method for producing a light polarizing element which comprises mixing glass flakelets with a resinous material hardenable to a transparent mass, hardening the resinous material, and subjecting the resulting mass to a shock to cause a disruption of glass-resin interfaces.

7. A method for producing a light polarizing element comprising wetting the surfaces of flakes of glass with a resin, forming a sheet of the wet flakes of glass, hardening the resin to form an integral mass of flakes of glass and resin, and subjecting the composite to a shock to disrupt resin and glass interfaces.

8. A method for producing a light polarizing sheet comprising intimately mixing a polyester resin with platelets of glass to wet completely the glass surfaces, forming a sheet of the mixture of resin and glass and heating to harden the resin, and after the resin is hardened reheating the sheet to a temperature sufficient to disrupt glass-resin interfaces and form a gaseous layer between glass and resin having an index of refraction different from that of said platelets of glass.

References Cited in the file of this patent

UNITED STATES PATENTS

| | | |
|---|---|---|
| 726,485 | Whitney | Apr. 28, 1903 |
| 2,017,705 | Sproxton | Oct. 15, 1935 |
| 2,402,176 | Marks | June 18, 1946 |
| 2,403,731 | MacNeille | July 9, 1946 |
| 2,669,751 | McCurdy et al. | Feb. 23, 1954 |
| 2,682,081 | Fisch | June 29, 1954 |
| 2,780,889 | Fulk | Feb. 12, 1957 |